United States Patent [19]

Altman

[11] 4,246,475

[45] Jan. 20, 1981

[54] FAIL-SAFE OPTICAL REPEATER-AMPLIFIER ASSEMBLY FOR FIBER OPTIC SYSTEMS

[75] Inventor: Daniel E. Altman, San Diego, Calif.

[73] Assignee: The United States of America as represented by the Secretary of the Navy, Washington, D.C.

[21] Appl. No.: 902,314

[22] Filed: May 3, 1978

[51] Int. Cl.² .............................................. H04B 9/00
[52] U.S. Cl. .................................. 455/612; 350/96.15; 370/1
[58] Field of Search ...................... 250/199; 350/96.15; 325/6, 5; 333/29; 179/170 R; 178/70 R, 10 T, 71, 73; 329/55, 56, 66, 67

[56] References Cited

U.S. PATENT DOCUMENTS

| | | | |
|---|---|---|---|
| 1,981,999 | 11/1934 | French | 250/199 |
| 4,112,293 | 9/1978 | Kach | 250/199 |

Primary Examiner—Benedict V. Safourek
Assistant Examiner—Edward L. Coles

Attorney, Agent, or Firm—Richard S. Sciascia; George J. Rubens; John W. McLaren

[57] ABSTRACT

In an optical data bus system, a fail-safe optical repeater-amplifier assembly is provided by light energy amplifying means connected in the data bus for developing gain of signal strength for light signals transmitted along the data bus in a known direction. The light energy amplifying means is connected in parallel with a passive, non-amplifying light path, the light path having an optical length for impressing a delay on light signals passing therethrough which is substantially equal to the optical delay imposed by transmission through the light energy amplifying means. The fail-safe optical repeater-amplifier assembly can be of unidirectional or bidirectional type; the passive non-amplifying light path connected in parallel with the light energy amplifying means can include partially reflective surfaces to provide diversion of light signals out of the passive non-amplifying light path or into the passive non-amplifying light path or in both directions to provide embodiments of the present invention in the form of either a unidirectional or bidirectional tee coupler.

5 Claims, 6 Drawing Figures

FAIL-SAFE OPTICAL REPEATER-AMPLIFIER ASSEMBLY FOR FIBER OPTIC SYSTEMS

BACKGROUND OF THE INVENTION

A general purpose information transfer system such as employed aboard naval vessels, for example, functions to provide point-to-point analog or digital signal information. Such a system may employ multiplexing, common data bus techniques, and coding for the interchange of signal information.

In such a system, multiple multiplexes and data buses may be employed with a plurality of carrier frequencies so that multiple separate messages may be transmitted simultaneously. When such a system is electrically implemented, it is subject to severe interference problems due primarily to electromagnetically noisy environment of a typical naval vessel.

Such problems and disadvantages can be largely obviated by the employment of optical signal transmission using fiber optic cables and electro-optical transducers, such as photodiodes and light emitting diodes, for example. However, the transmission of signal information over optical data buses incurs significant attenuation of the optical signal strength. One expedient is to increase the initial optical signal strength to sufficiently overcome the effects of long line optical data transmission. In such optical information transfer systems, however, there are frequently included a multiple number of taps on an optical data bus line, each of which incurs a degree of attenuation, apart from the attenuation incurred by reason of transmission along the data bus itself.

As the number of such taps on an optical data bus increases, a point is reached where the end-to-end loss exceeds the capability of the transmission-receiver combination overcome it. When this point is reached, additional gain of signal strength is required between the end couplers in order that the length of the optical data bus may be extended to provide a full and adequate system.

An amplifier assembly arranged to provide the required optical signal amplification is customarily referred to as an active device or repeater-amplifier. Though such optical signal amplifier assemblies are widely employed in optical information transfer systems, one basic objection to their inclusion in otherwise passive optical signal information systems is that the overall system reliability is decreased due to the fact that the failure of a single series-connected repeater-amplifier or its power source will render an entire optical bus inoperative.

It is therefore desirable that a fail-safe optical repeater-amplifier assembly be devised for use in an optical data bus arrangement so that the failure of such repeater-amplifier and/or its power source will not render the optical bus entirely and completely inoperative.

SUMMARY OF THE INVENTION

The present invention comtemplates a fail-safe optical repeater-amplifier assembly for use in an optical data bus. Light energy amplifying means, which may comprise the combination of a photosensitive element, electronic amplification, and a suitable transducer for converting amplified electronic signals to commensurately amplified light signals is connected in the data bus for developing a predeterminable gain of signals strength for light signals transmitted therealong in a known direction.

A passive, non-amplifying light path is connected to the data bus in parallel with the light energy amplifying means so that in the event of failure of the light energy amplifying means or its power source, the passive non-amplifying parallel light path continues to transmit light signal information with the result that the entire data bus is not rendered completely and entirely inoperative. That is to say, that an amount of signal information will be transmitted through the passive, non-amplifying light path connected in parallel with the light energy amplifying means so that the optical data bus continues to transmit signal information from one end to the other, though at a somewhat reduced amplitude.

In accordance with the concept of the present invention, it is necessary that the passive, non-amplifying light path connected to the data bus in parallel with the light energy amplifying means have an optical length for impressing a delay on light signals passing therethrough which is substantially equal to the optical delay imposed by transmission through the light energy amplifying means. This is required in order to avoid undesirable destructive interference between the light signals passing through the passive, non-amplifying light path and the light signals passing through the light energy amplifying means. The latter, of course, necessarily incurs some delay because of the conversion of received light signals to commensurate electrical signals, the amplification of such electrical signals, and, finally, the reconversion of the amplified electrical signals back to commensurately amplified light signals.

Typically, the passive, non-amplifying light path connected in the optical data bus in parallel with the light energy amplifying means may comprise a fiber optic cable formed in a configuration to produce an optical delay which is substantially equal to the optical delay imposed by transmission through the light energy amplifying means. Since the concept of the present invention requires that light signals be divided between a non-amplifying light path and the parallel-connected light energy amplifying means, partially reflective means may be positioned in the data bus to intercept light signals transmitted along the optical data bus for transmitting identical light signals of partial signal strength to each of the two parallel connected light paths comprised of a non-amplifying light path and the light energy amplifying means.

A bidirectional optical repeater-amplifier assembly is provided in accordance with the concept of the present invention by the inclusion of first and second light energy amplifying means connected with the data bus for developing a predeterminable gain of signal strength for light signals transmitted along the data bus in first and second directions, respectively. A passive non-amplifying light path is connected in parallel with the first and second light energy amplifying means and such light path has an optical length for impressing delay on light signals passing therethrough which is substantially equal to the optical delay imposed by transmission through the first and second light energy amplifying means. In a preferred embodiment of the present invention, the non-amplifying light path may comprise a fiber optic cable loop substantially symmetrically disposed between the first and second light energy amplifying means of the bidirectional optical repeater-amplifier assembly.

The concept of the present invention also contemplates an optical tee coupler which may comprise light energy amplifying means connected with a data bus for developing a predeterminable gain of signal strength for light signals transmitted along the data bus in a known direction and a passive, non-amplifying light path connected in parallel with the light energy amplifying means, such light path having an optical length for impressing a delay on light signals passing therethrough which is substantially equal to the optical delay imposed by transmission through said light energy amplifying means; means are included in the passive non-amplifying light path for deflecting partial signal strength of light signals transmitted therethrough for transmission to and through a proximately disposed optical path. Such means for deflecting partial signal strength of light signals into or out of the passive non-amplifying light path, may comprise partially reflective surfaces angularly disposed in the passive non-amplifying light path for reception by the proximately disposed optical path or, alternatively, for partially reflecting signals from the proximate optical path into the passive non-amplifying light path.

A further embodiment of the present invention comprises a bedirectional optical tee coupler which includes first and second light energy amplifying means, preferably connected in parallel with each other in the data bus for developing a predeterminable gain of signal strength for light signals transmitted along the data bus in first and second directions, respectively; a passive, non-amplifying light path is connected in parallel with the first and second light energy amplifying means and provides an optical length for impressing a delay on light signals passing therethrough which is substantially equal to the optical delay imposed by transmission through the first and second light energy amplifying means.

As in the case of the unidirectional optical tee coupler, an optical path is disposed proximate to the passive, non-amplifying light path which includes means for bidirectionally deflecting partial signal strength of light signals transmitted therethrough for transmission through the optical path. Such means may comprise multiple partially reflective surfaces angularly disposed in the passive non-amplifying light path for bidirectionally reflecting partial signal strength out of the light path and bidirectionally reflecting into the light path such bidirectional input light signals as may be received from the proximate optical path. This latter arrangement may preferably take the form of a fiber optic cable loop substantially symmetrically disposed between the first and second light energy amplifying means and optically coupled to the proximately disposed optical light path by means of such partially reflective surfaces suitably angularly disposed.

Accordingly, it is a primary object of the present invention to provide a fail-safe optical repeater-amplifier assembly which may be included in an optical information transfer system to preserve minimal operation of one or more data buses in such systems notwithstanding the failure of one or more repeater-amplifiers or the failure of their power source.

A further important object of the present invention is to provide such a fail-safe optical repeater-amplifier assembly which includes a passive, non-amplifying light path having an optical delay which is substantially equal to the optical delay imposed by transmission of light signals through the light energy amplifying means so as to obviate undesirable destructive interference of the light signal information transmitted through the parallel connected optical paths.

A further object of the present invention is to provide a bidirectional optical repeater-amplifier assembly which is not only fail-safe, but is capable of sustaining minimal operation of an optical data bus in a bidirectional sense.

A further object of the present invention is to provide an optical tee coupler for transferring signal information into or out of an optical data bus in an arrangement which includes a fail-safe repeater-amplifier assembly.

Yet a further object of the present invention is to provide a bidirectional tee coupler which will function to transfer light signal information both into and out of an optical data bus as part of an arrangement which includes a fail safe repeater-amplifier assembly.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

In a data bus employed for information transfer purposes over extended distances, a point may be reached where the end-to-end loss exceeds the capability of the transmitter-receiver combination in and of itself to overcome such loss. When this point is reached, additional gain must be provided between the end couplers so that the data bus may be extended to any required or necessary length.

Whether such a system be designed for the purpose of transmitting electronic signal information only or for transmitting optical signal information only, some amplifying means must be provided to supply the required signal amplification.

Customarily, such amplifying signal amplifying means is referred to an active device or repeater. When such active amplifying devices or repeaters are employed in series connection in a data bus, a basic disadvantage arises upon the failure of the repeater or its power supply because the entire data bus is thereby rendered inoperative for transmitting any signal information from one end to the other.

Figure 1:
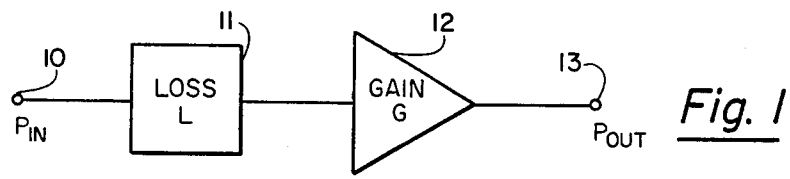
FIG. 1 is a schematic presentation of the loss and gain factors involved in an optical data bus.

Such a conventional repeater arrangement is shown in FIG. 1. The power input $P_{in}$ is shown being received at an input terminal 10 in FIG. 1. The data transmission system imposes a loss L on the input signal information represented schematically at 11 in FIG. 1. To compensate for the loss L, an amplification means 12 is provided connected in series in the data bus and having a gain G. If GL=1, the power out which is received at the output terminal 13 will equal the power input provided to the input terminal 10 and the effect of signal attenuation will have been overcome.

Unfortunately, however, in the circumstance where G becomes zero due to failure of the amplifying means and/or its power supply, the transmission loss becomes infinite thereby rendering the data bus inoperative for purposes of transmitting signal information from its input terminal 10 to its output terminal 13.

The present invention contemplates a unique fail-safe repeater-amplifier assembly for use in an optical data bus system which overcomes the disadvantage of such data bus becoming totally inoperative because of the failure of the amplifying means or its power supply.

Figure 2:
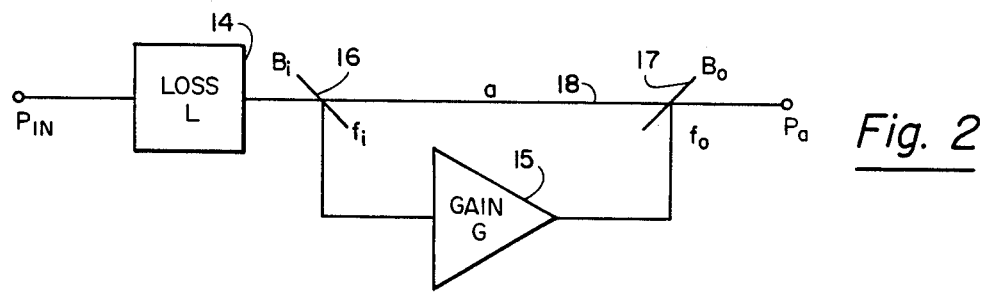
FIG. 2 is a schematic representation of a simple form of embodiment of the present invention.

FIG. 2 is a schematic representation of the simplest embodiment of the present invention. In FIG. 2 an optical data bus which forms part of an optical information transfer system is represented to have a loss L schematically shown at 14 and an amplifier 15 providing a gain G. In the arrangement of FIG. 2 the optical data bus includes beam splitters 16 and 17 which are arranged to split optical signal information between the light energy amplifying means 15 having a gain G and a passive non-amplifying parallel path 18 having a loss "a." The beam splitters 16 and 17 have optical coupling factors of $f_i$ and $f_o$ and $B_i$ and $B_o$ representing the total backscatter ratio at input and output, respectively, as shown in FIG. 2. The system will remain stable so long as $$(Gf_o B_o a B_i f_i) < 1. \quad (1)$$

The power output of the arrangement illustrated in FIG. 1 is, $$P_{out} = P_{in} L[f_i f_o G + (1-f_i)(1-f_o)a]. \quad (2)$$

For a perfectly compensated system in which $P_{out} = P_{in}$, the required gain G may be calculated from the relationship $$G = \frac{1}{L f_i f_o} - \frac{(1-f_i)(1-f_o)a}{f_i f_o} \quad (3)$$

With this arrangement of the concept of the present invention in the embodiment as illustrated simply in the schematic of FIG. 1, failure of the amplifier will reduce the signal strength by the factor $$La(1-f_o)(1-f_i) \quad (4)$$

but the data bus will continue to transfer optical signal information and will not become entirely and wholly inoperative. Since the loss "a" a will ordinarily be quite small, and $f_i$ and $f_o$ can be made as small as reasonably desirable by correspondingly increasing the gain and power output of the amplifier 12, the signal loss factor upon failure of the amplifier 12 can be made essentially equal to the loss L. The L can in turn be made as small as reasonably desired by subdividing the system and corresponding increasing the number of repeater-amplifiers employed.

The power output, $P_a$, required from the amplifier for a given system power level, $P_{in}$, is equal to the system power loss to be compensated, $P_{in}[1-(1-f_o)(1-f_i)aL]$, increased by the output beam splitter loss, $f_o$. Thus the required power $$P_a = \frac{P_{in}}{f_o}[1 - (1-f_o)(1-f_i)aL]. \quad (5)$$

For a typical system power level of $10^{-4}$ watts, an attenuation, aL, of 0.5, and a reflectivity of 10 percent for both beam splitters, an amplifier output capability of 0.6 mW would be required.

Figure 3:
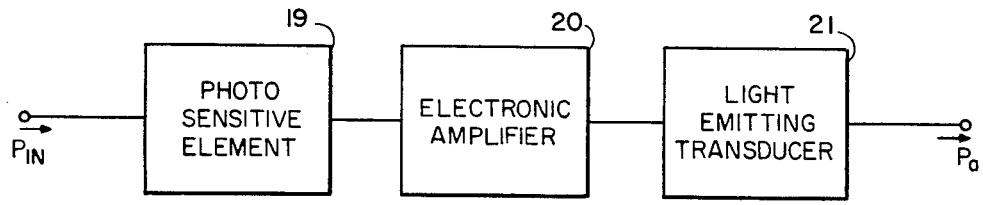
FIG. 3 is a block diagram schematic representation of the elements of a typical light energy amplifying means such as may be employed in the practice of the present invention.

As shown FIG. 3, typically the light energy amplifying means employed in the present invention may include a photo-sensitive element 19 which is responsive to incoming optical signal information to produce commensurate electronic signal information. Such electronic signal information is appropriately amplified in an electronic amplifier 20 as shown in FIG. 3 and fed to a light-emitting transducer 21 which performs the function of producing commensurately amplified light signal information in response to its received electronically amplified input. Typically, the light emitting transducer may comprise a light emitting diode and the photo-sensitive element 19 may comprise a photo-diode which has the required speed and bandwidth responses.

Figure 4:
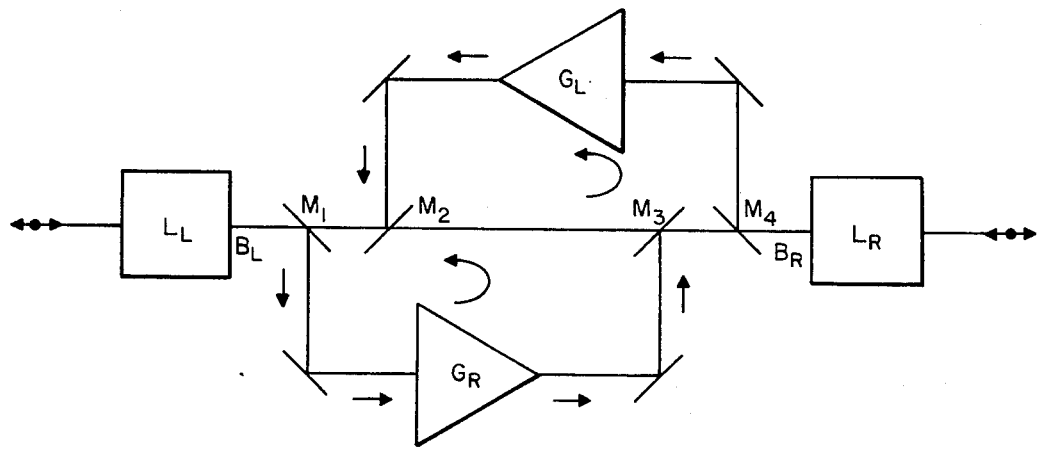
FIG. 4 is a schematic representation of a bidirectional fail-safe repeater-amplifier assembly embodying the present invention.

Extension of this concept to bidirectional operation is illustrated in FIG. 4. In FIG. 4, right- and left-directed signals are amplified by separate amplifiers having power gains $G_R$ and $G_l$ respectively. Transmission loss factors to the left and right of the repeaters are $L_L$ and $L_R$ respectively. For signals directed to the right, $L_L$ is compensated for by $G_R$, $L_R$ is compensated for by the next repeater to the right. Similarly, for left-directed signals the loss $L_R$ is compensated for by $G_L$; and $L_L$ is compensated for by the next repeater to the left. With each of the beam splitters, $M_1$, $M_2$, $M_3$ and $M_4$, is associated a coupling fraction $f_n$ and a backscatter factor $B_n$. In addition, the left- and right-hand transmission media have backscatter factors $B_L$ and $B_R$, respectively. System stability requires that the loop gains around each of the three feedback loops in the system be less than unity. Thus in the case of the upper loop it is required that $$G_L a(1-f_2)\{B_4 + f_4(1-f_4)[B_1 + (1-f_1)^2 B_L][B_3 + f_3(1-f_3)B_R]\} < 1. \quad (6)$$

In the case of the lower loop, $$G_R a(1-f_4)\{B_2 + f_2(1-f_2)[B_3 + (1-f_3)^2 B_r][B_{11} + f_1(1-f_1)B_L]\} < 1. \quad (7)$$

An in the case of the outside loop, $$G_L G_R f_2 f_4 [B_1 + f_1(1-f_1)B_L][B_3 + f_3(1-f_3)B_R] < 1. \quad (8)$$

Since each of the above expressions contains backscatter, B, as a factor, whatever gain is needed for loss compensation will be permitted if the backscatter can be sufficiently reduced. The gains required for complete compensation are $$G_L = \frac{1 - L_L a(1-f_1)(1-f_2)(1-f_3)(1-f_4)}{L_L f_1 f_3 (1-f_4)} \quad (9)$$

and $$G_R = \frac{1 - L_R a(1 - f_1)(1 - f_2)(1 - f_3)(1 - f_4)}{L_R f_4 f_2 (1 - f_1)} \quad (10)$$

In applying this concept, the following qualifications must be considered:
(1) The time delays of the two parallel transmission circuits must be matched to within a small fraction of the data or subcarrier period as the case may be.
(2) The method actually used for combining the direct and amplified signals must provide a high directivity so as to minimize backscatter and must have a reasonably low power loss.
(3) Backscatter in the adjacent transmission system must also be minimized.

Figure 5:
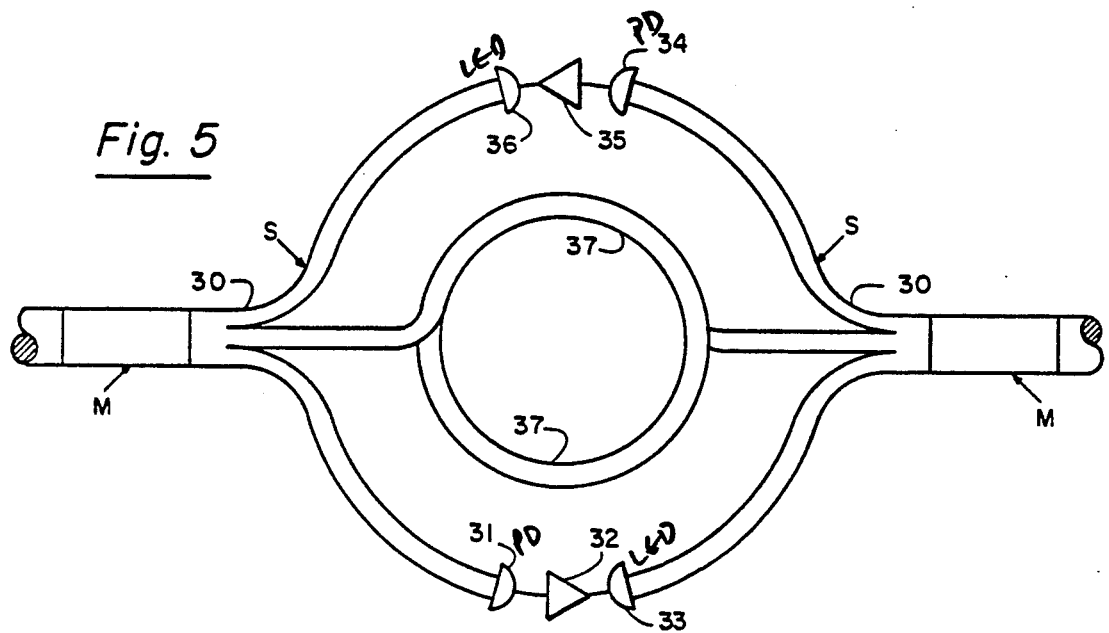
FIG. 5 is a partially schematic, partially pictorial representation of a bidirectional fail-safe repeater-amplifier embodying the present invention as it may be employed in a fiber optic cable data bus; and, FIG. 6 is a partially schematic, partially pictorial representation of a fail-safe active bidirectional tee coupler embodying the present invention as it may be employed in a fiber optic cable system.

FIG. 5 shows a bidirectional repeater-amplifier based on the foregoing concept. Power division is accomplished by division of the fiber bundle 30 at S. A portion of the signal coming from the mixing block, M, at the left is separated from the main channel by bundle division at S, is amplified by the photodiode 31, amplifier 32, driver and LED 33 combination, after which a fraction is coupled back into a mixing block, M, at the right.

Signals traveling to the left follow the upper path in similar fashion. A delay loop 37, is provided in the main channel to equalize the time delays in the three channels. The amplifier time delay is a function of the device rise times, lead propagation times, and the delay of any equalizing circuits in the amplifiers. The mixing block serves to spread the amplified and direct signals uniformly over the output bundle. Since backscatter limits the usable stable gain of the device, the coupling surfaces of the mixing block should be treated to minimize Fresnel reflection with, for example, index matching fluid or antireflection coating.

Figure 6:
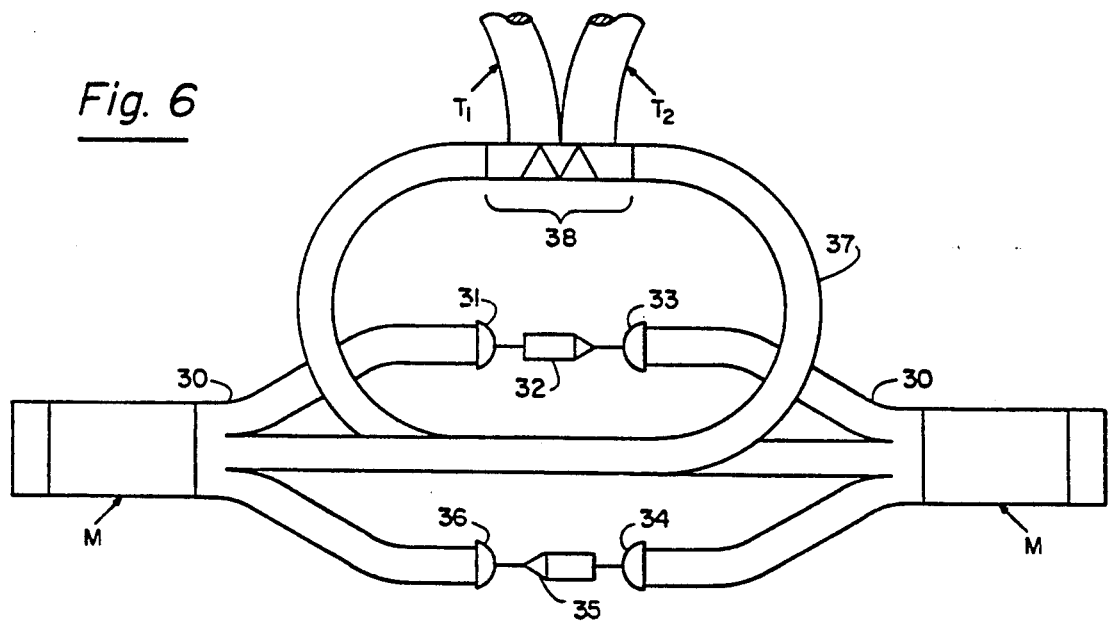

FIG. 6 shows one way of applying the foregoing concept to combine the amplification function with the tee coupler function at each of the dual taps on a primary bus. This design is the same as the one previously described except that a duel internal mirror mixing block 38, is inserted at the center of the delay loop 37, where it provides coupling between the area multiplexing stubs in the form of proximate optical paths and the primary bus. Placing it at this symmetrically located point in the repeater provides the same time delay and signal amplitude for both directions of transmission. T$_1$ and T$_2$ designating the fiber optic cables leading to the area multiplexers. The other designations are the same as the previous example. Accordingly, it will be readily appreciated by those skilled and knowledgeable in the pertinent arts that the concept of the present invention provides a repeater-amplifier assembly for use in a typical optical data bus for the transmission and transfer of optical signal information which is fail-safe and will not permit the entire optical bus to be rendered inoperative by reason of the failure of its amplifying component.

Additionally, the concept of the present invention is such that it is readily adaptable to being embodied in bidirectional form for providing the fail-safe repeater-amplifier functions in two opposite directions.

Moreover, the concept of the present invention as explained and illustrated is readily adapted to provide a convenient tee coupler of a unidirectional or bidirectional type for coupling optical signal information into a out of a data bus as, well as performing the repeater-amplifier functions as explained in and illustrated in its simpler and less complicated forms.

Obviously, many other modifications and variations of the present invention are possible in the light of the above teachings. It is therefore to be understood that within the scope of the appended claims the invention may be practiced otherwise than as specifically described.

What is claimed is:
1. In an optical data bus system an optical tee coupler comprising:
light energy amplifying means connected with said data bus for developing a predeterminable gain of signal strength for light signals transmitted along said data bus in a known direction;
a passive, non-amplifying light path connected in parallel with said light energy amplifying means,
said light path having an optical length for impressing a delay on light signals passing therethrough which is substantially equal to the optical delay imposed by transmission through said light energy amplifying means;
an optical path disposed proximate to said passive, non-amplifying light path; and
means included in said passive, non-amplifying light path for deflecting partial signal strength of light signals transmitted therethrough from transmission through said optical path.
2. The optical tee coupler claimed in claim 1 wherein said means included in said passive, non-amplifying light path for deflecting partial signal strength of light signals transmitted therethrough comprises partially reflective surfaces angularly disposed in said light path for reflecting partial signal strength out of said light path and reflecting into said light path, input light signals received from said optical path.
3. In an optical data bus system a bidirectional optical tee coupler comprising:
first light energy amplifying means connected with said data bus for developing a predeterminable gain of signal strength for light signals transmitted along said data bus in a first direction;
second light energy amplifying means connected with said data bus for developing a predeterminable gain of signal strength for light signals transmitted along said data bus in a second direction opposite to said first direction;
a passive, non-amplifying light path connected in parallel with said first and second light energy amplifying means,
said light path having an optical length for impressing a delay on light signals passing therethrough which is substantially equal to the optical delay imposed by transmission through said first and second light energy amplifying means;
an optical path disposed proximate to said passive, non-amplifying light path; and
means included in said passive, non-amplifying light path for bidirectionally deflecting partial signal strength of light signals transmitted therethrough for transmission through said optical path.
4. The bidirectional optical tee coupler claimed in claim 3 wherein said means included in said passive, non-amplifying light path for bidirectionally deflecting partial signal strength of light signals passing therethrough comprises multiple partially reflective surfaces angularly disposed in said light path for bidirectionally reflecting partial signal strength out of said light path and bidirectionally reflecting into said light path, bidirectional input light signals received from said optical path.

5. The bidirectional tee coupler claimed in claim 3 wherein the passive, non-amplifying light path comprises a fiber optic cable loop substantially symmetrically disposed between said first and second light energy amplifying means.

* * * * *